United States Patent [19]

Inoue et al.

[11] Patent Number: 4,605,979
[45] Date of Patent: Aug. 12, 1986

[54] LOAD/UNLOAD SUSPENSION DEVICE FOR A MAGNETIC DISC APPARATUS

[75] Inventors: Yohichi Inoue; Katsuyuki Tanaka; Yoshinori Takeuchui; Isao Koromegawa, all of Ibaraki; Yuzoo Yamaguchi, Tsuchiura; Yokuo Saitoh, Kanagawa, all of Japan

[73] Assignee: Hitachi, Ltd., Tokyo, Japan

[21] Appl. No.: 592,256

[22] Filed: Mar. 22, 1984

[51] Int. Cl.$^4$ .................... G11B 5/54; G11B 21/22; G11B 5/48; G11B 21/16

[52] U.S. Cl. .................... 360/105; 360/104; 360/97

[58] Field of Search ............... 360/99, 104, 105, 106, 360/97, 86

[56] References Cited

U.S. PATENT DOCUMENTS

| 4,167,765 | 9/1979 | Watrous | 360/104 |
| 4,347,535 | 8/1982 | Dalziel | 360/99 |
| 4,423,449 | 12/1983 | Hasegawa | 360/99 |

FOREIGN PATENT DOCUMENTS 52-49013  4/1977  Japan .................... 360/105
57-158069A  9/1982  Japan .................... 360/104

OTHER PUBLICATIONS

IBM Technical Disclosure Bulletin, vol. 25, No. 10, Mar. 1983, p. 4987, "Magnetic Head Suspension Assembly" by Bhat et al.

*Primary Examiner*—Stuart N. Hecker
*Assistant Examiner*—Alfonso Garcia
*Attorney, Agent, or Firm*—Antonelli, Terry & Wands

[57] ABSTRACT

A slider equipped with a magnetic head is pressed on a magnetic disk surface under a constant pressure by a pressing member. The slider is loaded and unloaded by a loading/unloading mechanism. A driving unit of the loading/unloading mechanism has a shape memory alloy member which offers a shape memory effect based on the thermoelastic martensitic transformation, and a resilient member having a resilient force against the driving force of the shape memory alloy member. Moreover, the loading/unloading mechanism is arranged such that when the slide is loaded, the driving force of the loading/unloading mechanism is not applied to the pressing member supporting the slider.

4 Claims, 14 Drawing Figures

LOAD/UNLOAD SUSPENSION DEVICE FOR A MAGNETIC DISC APPARATUS

BACKGROUND OF THE INVENTION

The present invention relates to an actuator for loading/unloading a slider in a magnetic disk apparatus, a floppy disk apparatus or the like, and more particularly, to an actuator for loading/unloading a slider which permits the slider to land on a disk surface extremely smoothly.

A typical conventional floating head slider generally effects a stable floating on the order of about 0.2 $\mu$m from a disk surface when rotating at a constant speed. The greatest technical problem of this slider is to avoid any crush thereof on the disk surface. The slider is required to have a high reliability, particularly in its operation in a non-stationary state, such as the landing thereof. In order to meet this need, such a driving unit of a means for loading/unloading the slider has been proposed as employing a shape memory alloy member. In such a structure, however, it is difficult to apply a constant pressing force to the slider, since the slider equipped with a magnetic head and the shape memory alloy member operate as one unit. In addition, since the driving force derived from the shape memory alloy member is directly applied against the resilient force of a pressing member supporting the slider, it is not possible to largely change the pressing force and the resilient force derived through the deformation of the shape memory alloy member, so that the motion is unstable and the operating speed is low, disadvantageously.

SUMMARY OF THE INVENTION

Accordingly, it is a primary object of the invention to provide an actuator for loading/unloading a slider which can apply a smooth and stable pressing force to the slider.

It is another object of the invention to provide an actuator for loading/unloading a slider which can apply a constant pressing force to the slider when it is loaded.

To these ends, according to the invention, there is provided an actuator for loading/unloading a slider having: a slider equipped with a magnetic head; a pressing member having the slider secured to it and adapted to press the slider on a disk surface; and a loading/unloading means provided so as to be against the pressing force of the pressing member, wherein the loading/unloading means has a driving unit constituted by: a shape memory alloy member which displays a shape memory effect based on the thermoelastic martensitic transformation; and a resilient member having a resilient force which is disposed so as to be against the recovery force of the shape memory alloy member. Moreover, in addition to the above construction, the actuator is arranged such that when the slider is loaded, the forces of the shape memory alloy member and the resilient member are not applied to the pressing member, and the slider at the distal end of the pressing member can be pressed on the disk surface under a constant pressure.

BRIEF DESCRIPTION OF THE DRAWINGS

FIGS. 1 to 3 in combination illustrate an embodiment of the actuator for loading/unloading a slider in accordance with the invention, in which: FIG. 1 is a side view; FIG. 2 is a sectional view of a loading/unloading means before the rotation of a magnetic disk is started; and FIG. 3 is a sectional view of the loading/unloading means when the rotation of the magnetic disk is started; and FIGS. 4 to 14 illustrate other embodiments of the actuator for loading/unloading a slider in accordance with the invention, in which: FIGS. 4 to 10, FIG. 12 is a side view; and FIG. 11 is a sectional view.

DESCRIPTION OF THE PREFERRED EMBODIMENTS

First of all, a shape memory effect based on the thermoelastic martensitic transformation will be explained hereinunder. A shape memory alloy, such as a Ti-Ni alloy, has the austenitic structure (matrix phase) at a temperature not lower than its transformation point. This phase is transformed into the martensitic phase at a temperature not higher than the transformation point, so that the alloy is easily deformed by the application of an external small force. When the alloy is heated to a temperature not lower than the transformation point again, the martensitic phase is elastically returned to the former austenitic phase (inverse transformation) according to a given ordered crystalline orientation law. The alloy has the property of offering an exceedingly large recovery force when returning to the austenitic phase.

The employment of a resilient force as a bias force for deformation of the martensitic-phase alloy at a low temperature permits the alloy to effect a reversible operation with a heat cycle.

In specific view of the phenomenon that the martensitically transformed portion of a shape memory alloy under a resilient load stress gradually progresses as the alloy is cooled, the invention makes use of a continuous change in recovery force generated during the progress.

Figure 1:
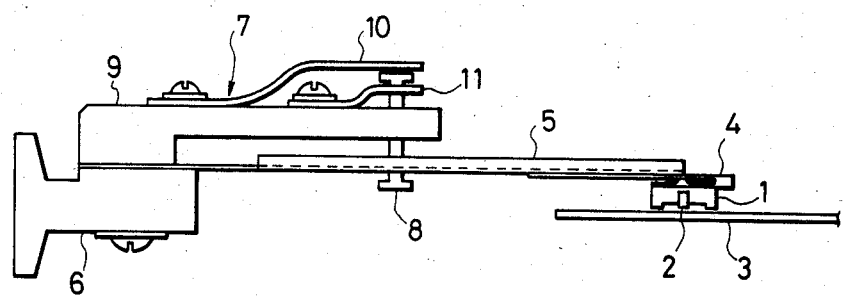
Figure 2:
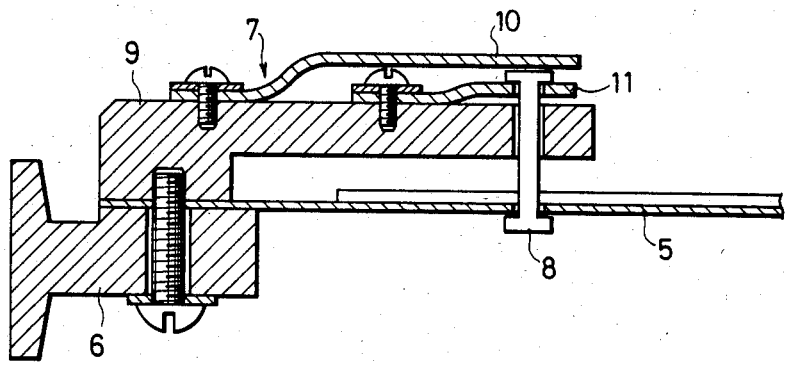
Figure 3:
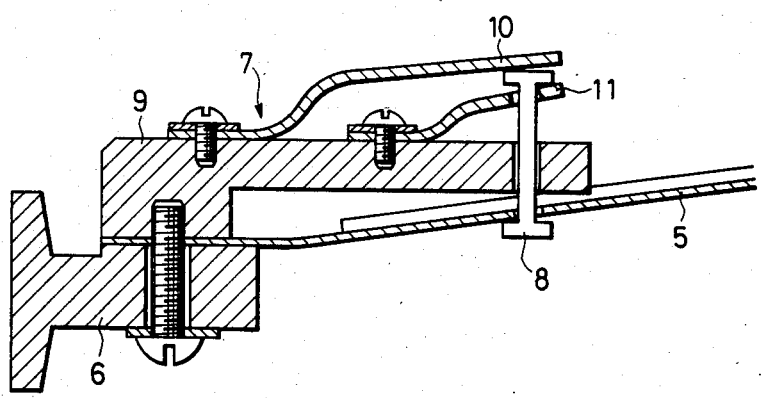
Figure 4:
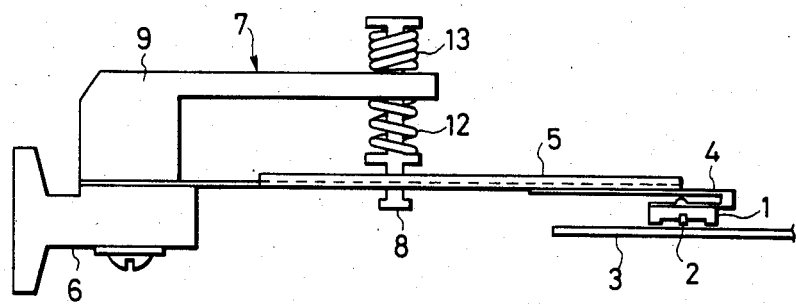

An embodiment of the actuator for loading/unloading a slider in accordance with the invention will be described hereinunder with reference to FIGS. 1 to 3.

A magnetic head 2 attached to a part of a slider 1 is adapted to write data on a rotating magnetic disk 3 and read out the data written on the magnetic disk 3. The slider 1 is mounted on the distal end of a load arm 5, as a pressing member, through a gimbals 4. The load arm 5 as a pressing member has a resilient force for pressing the slider 1 on a magnetic disk surface under a constant pressure. Moreover, the load arm 5 has its proximal part attached to a movable guide bar 6 so that the slider 1 can access any desired track on the magnetic disk surface. The guide bar 6 is provided thereon with a loading/unloading means 7 against the pressing force applied by the load arm 5. The loading/unloading means 7 is constituted by: a pin 8 for lifting up the load arm 5; a resilient leaf spring 10, as a resilient member, provided on a support base 9 so that a downward pressing force is constantly applied to the pin 8; an Ni-Ti shape memory alloy plate 11, as a shape memory alloy member, provided on the support base 9 and adapted to apply a shape memory alloy recovery force in the direction against the resilient force applied by the resilient leaf spring 10; and a current feed line (not shown) for energizing the shape memory alloy plate 11 to heat up to a temperature not lower than its transformation point. The pin 8 extends through the load arm 5 and has at its lower end a hook engaging with the load arm 5 in order to lift up the same. The pin 8 further has at its upper end a hook engaging with the shape memory alloy plate 11.

The loading/unloading operation will be explained hereinunder with reference to FIGS. 2 and 3. FIG. 2 shows the loading/unloading means 7 before the rotation of the magnetic disk 3 is started. Under this initial state, the shape memory alloy plate 11 is in the martensitic phase, and the pin 8 is being downwardly pressed by the resilient force of the resilient leaf spring 10 since the yield strength of the shape memory alloy plate 11 is set to be smaller than the resilient force of the resilient leaf spring 10. Accordingly, the load arm 5 is not in contact with the hook at the lower end of the pin 8.

When the rotation of the magnetic disk 3 is started, the shape memory alloy plate 11 is energized immediately before the start of the rotation, to heat up to a temperature not lower than its transformation point. In consequence, the shape memory alloy plate 11 resiliently returns to the austenitic phase (inverse transformation), so that a shape memory alloy recovery force which is larger than the resilient force of the resilient leaf spring 10 acts upwardly. The upward shape memory alloy recovery force of the shape memory alloy plate 11 causes the pin 8 to move upwardly. As a result, the hook at the lower end of the pin 8 engages with the load arm 5 and lifts up the same, i.e., performs an unloading operation. This state is shown in FIG. 3. Under this state, the rotation of the magnetic disk 3 is started and continued until a predetermined rotational speed is reached. When the magnetic disk 3 reaches a predetermined rotational speed, the energization for heating the shape memory alloy plate 11 is suspended. In consequence, the shape memory alloy plate 11 cools down to start the martensitic transformation, so that the upward recovery force gradually decreases to become smaller than the resilient force of the resilient leaf spring 10. As the yield strength of the shape memory alloy plate 11 decreases, the pin 8 is pressed back downwardly. As a result, the load arm 5 engaging with the hook at the lower end of the pin 8 is released from the upward lifting force and presses the slider 1 on a magnetic disk surface with a constant pressure, i.e., performs a loading operation.

In this embodiment, the martensitically transformed portion of the shape memory alloy plate 11 gradually progresses or expands as the temperature lowers; therefore, the slider 1 effects an extremely smooth landing operation. Moreover, since the loading/unloading operation is effected through both the resilient force of the resilient leaf spring 10 and the recovery force of the shape memory alloy plate 11, it is possible to set the forces to be larger than the pressing force applied to the slider 1. It is thereby possible to stabilize the operation of the slider 1 and increase the operation speed.

In addition, since the loading/unloading means 7 having the shape memory alloy plate 11 and the resilient leaf spring 10 and the load arm 5 provided with the slider 1 are adapted to operate independently of each other, it is possible to apply a constant pressing force to the slider 1 at all times in the loading operation. This is because that if there are any variations in pressing force of the shape memory alloy plate 11 due to the environmental temperature or the deterioration with age or variations in pressing force due to an insufficient fine adjustment in assembly, no variations will be transmitted to the load arm 5.

Further, since the shape memory alloy plate 11 and the load arm 5 are not constructed as one unit, it becomes easy to heat the shape memory alloy plate 11 through energization, and the operation control is facilitated.

Furthermore, since only the resilient leaf spring 10 and the shape memory alloy plate 11 are employed as drive source members constituting the loading/unloading means 7, the manufacturing cost is reduced, and the assembly operation is facilitated, advantageously.

Other embodiments of the actuator for loading/unloading a slider in accordance with the invention will be described hereinunder with reference to FIGS. 4 to 14. In the embodiment shown in FIG. 4, the resilient member and the shape memory alloy member, which are tabular in the embodiment described with reference to FIGS. 1 to 3, are replaced with a helical resilient compression spring 12 and a shape memory alloy coil 13, respectively. The shape memory alloy coil 13 is adapted to elongate when heated to a temperature not lower than its transformation point.

In this embodiment, the resilient compression spring 12 is disposed between an intermediate hook of the pin 8 and the support base 9, while the shape memory alloy coil 13 is disposed between the upper end hook of the pin 8 and the support base 9. This arrangement still makes it possible to perform a loading/unloading operation similar to that in the embodiment shown in FIGS. 1 to 3 and obtain a similar effect.

Figure 5:
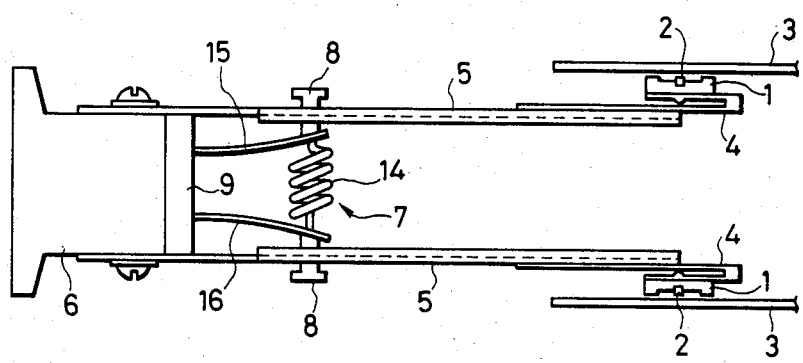

The embodiment shown in FIG. 5 is arranged in view of application of the invention to a magnetic disk apparatus having a multiplicity of magnetic disks 3. In this embodiment, a shape memory alloy coil 14 as a shape memory alloy member which contracts when heated to a temperature not lower than its transformation point is mounted between resilient leaf springs 15, 16 as resilient members, which apply bias forces to elongate the shape memory alloy coil 14 at a temperature not higher than the transformation point. In this embodiment, when heated to a temperature not lower than its transformation point, the shape memory alloy coil 14 contracts against the resilient forces of the resilient leaf springs 15, 16. In consequence, the load arms 5 are moved through the pin 8 connected to the resilient leaf springs 15, 16 to perform an unloading operation.

On the other hand, when the energization for heating the shape memory alloy coil 14 is suspended, the shape memory alloy coil 14 cools down to a temperature not higher than its transformation point, so that its recovery force gradually decreases. As a result, the pin 8 is disengaged from the load arms 5 by means of the resilient forces of the resilient leaf springs 15, 16, causing the sliders 1 to be pressed on the respective magnetic disk surfaces under a constant pressure. In other words, a loading operation is effected.

Figure 6:
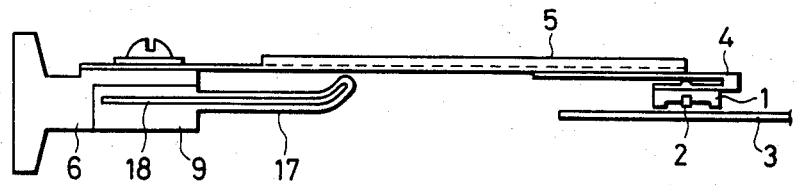

In the embodiment shown in FIG. 6, as a resilient member for applying a bias force, a silicone resin 17 is employed to coat the outside of a shape memory alloy wire 18 as a shape memory alloy member. FIG. 6 shows the initial suspended state. When the rotation of the magnetic disk 3 is started, the shape memory alloy wire 18 is energized to heat up to a temperature not lower than its transformation point. In consequence, a large recovery force acts upwardly to move the load arm 5 upwardly, causing the slider 1 to be pushed up. This embodiment makes it possible to reduce the number of components by a large margin. In addition, it is possible to obtain an excellent vibration resistance, conveniently, since the silicone resin 17 is employed at the point of contact between the shape memory alloy wire 18 and the load arm 5. Moreover, since the whole of the shape memory alloy wire 18 is coated with the silicone resin 17, the heat transfer rate with respect to the outside air temperature is lowered to allow the shape memory alloy wire 18 to be easily heated, advantageously.

Figure 7:
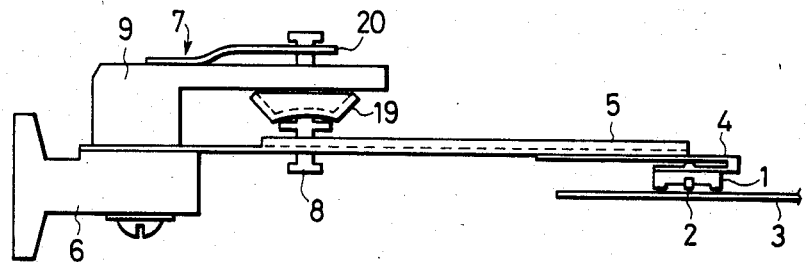

In the embodiment shown in FIG. 7, a conical spring 19 is employed as a resilient member for applying a bias force. The Figure shows the initial suspended state. When the rotation of the magnetic disk 3 is started, a shape memory alloy plate 20 as a shape memory alloy member is energized to heat up. In consequence, the recovery force of the shape memory alloy plate 20 acts upwardly to push up the slider 1. This embodiment makes it possible to construct an exceedingly thin actuator, conveniently.

Figure 8:
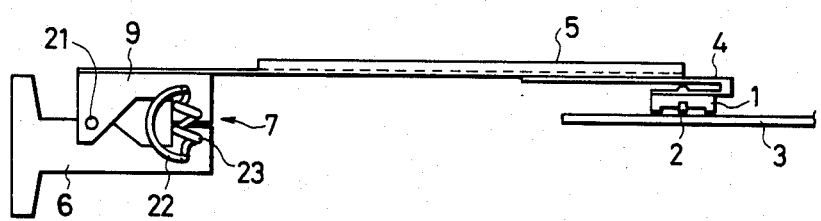
Figure 9:
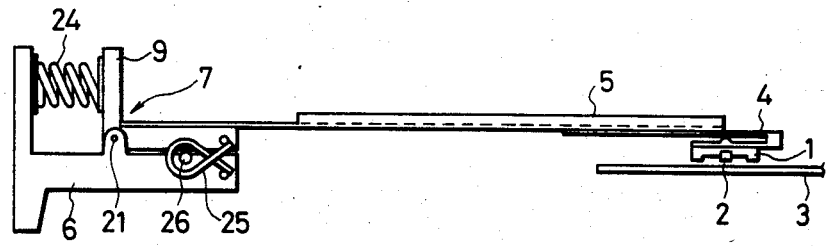
Figure 10:
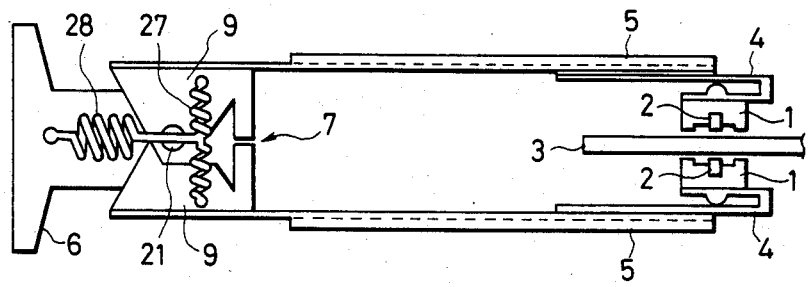

The embodiments shown in FIGS. 8 to 10 are arranged such that the slider 1 can be pushed up by the part of the load arm 5 closer to the load arm 5. The Figures all show the initial suspended state. In these embodiments, the support base 9 for the loading/unloading means 7 is pivotally supported by the guide bar 6 through a pin 21. The load arm 5 is attached to the support base 9.

The embodiment shown in FIG. 8 employs a U-shaped shape memory alloy wire 22 as a shape memory alloy member and a tension spring 23 as a resilient member for applying a bias force, which are disposed between the guide bar 6 and the support base 9. When the rotation of the magnetic disk 3 is started, the U-shaped shape memory alloy wire 22 is energized to heat up. In consequence, the recovery force of the U-shaped shape memory alloy wire 22 acts in the expanding direction against the tension spring 23. Thus, the support base 9 pivots about the pin 21 to push up the slider 1. In this embodiment, no external force is applied to the load arm 5; therefore, no strain will be generated, advantageously.

The embodiment shown in FIG. 9 employs a compression spring 24 as a resilient member for applying a bias force and a shape memory alloy wire 25 as a shape memory alloy member, which are disposed between the guide bar 6 and the support base 9. Further, the guide bar 6 is provided thereon with a heating element 26 as a means for heating the shape memory alloy wire 25.

When the rotation of the magnetic disk 3 is started, the shape memory alloy wire 25 is heated by energizing the heating element 26. In consequence, the recovery force of the shape memory alloy wire 25 acts in the expanding direction against the resilient force of the compression spring 24. As a result, the support base 9 pivots about the pin 21 to push up the slider 1. In this embodiment, no external force is applied to the load arm 5; therefore, no strain will be generated, advantageously. Moreover, since the heating element 26 is separately provided, there is no need for directly energizing the shape memory alloy wire 25 to heat up, so that the mounting of the shape memory alloy wire 25 is facilitated, favorably.

The embodiment shown in FIG. 10 is arranged such that data can be written and read out by means of the magnetic heads 2, 2 with respect to both the upper and lower surfaces of the magnetic disk 3. In this embodiment, two support bases 9, 9 are pivotally supported by the guide bar 6 through the pin 21. In addition, each of the support bases 9, 9 has the load arm 5 attached thereto and having the slider 1 provided at its distal end. A tension spring 27 as a resilient member for applying a bias force is disposed between the support bases 9, 9. On the other hand, a shape memory alloy coil 28 as a shape memory alloy member is disposed between the guide bar 6 and an intermediate point of the tension spring 27. The disposing position of the shape memory alloy coil 28 is selected so that the two support bases 9, 9 pivot about the pin 21 in the same way.

When the rotation of the magnetic disk 3 is started, the shape memory alloy coil 28 is energized to heat up. In consequence, the shape memory alloy coil 28 contracts to cause the connection between the shape memory alloy coil 28 and the tension spring 27 to move from the pivoting point of both the support bases 9, 9 toward the side remoter from the sliders 2, 2. As a result, the load arms 5, 5 are pivoted by the resilient force of the tension spring 27 to lift up the sliders 1, 1, respectively. According to this embodiment, no external force is applied to the load arms 5, 5; therefore, no strain will be generated, advantageously. Moreover, the two sliders can be loaded and unloaded by a single shape memory alloy member, conveniently. In addition, the toggle mechanism permits the actuator to be stable even in the slider lifting state, advantageously.

Figure 11:
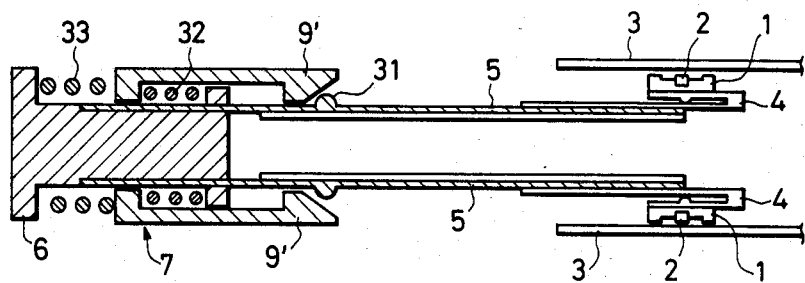

The embodiment shown in FIG. 11 is arranged such that data can be simultaneously written and read out by two magnetic heads 2, 2 with respect to two magnetic disks 3, 3. In this embodiment, the support base for the loading/unloading means 7 is constituted by an outer tubular member 9' slidably supported by the guide bar 6. Further, the outer tubular member 9' has an inclined part formed at the end 9a' thereof closer to the sliders 2, 2 so that when the outer tubular member 9' slides toward the sliders 2, 2, the inclined part engages with projections 31 formed on the load arms 5, respectively, to pivot the load arms 5. Between the guide bar 6 and the outer tubular member 9' as a support base are disposed a compression spring 32 as a resilient member for applying a bias force and a shape memory alloy coil 33 as a shape memory alloy member. The Figure shows an initial suspended state where the sliders 1, 1 are pressed on the surfaces of the respective magnetic disks 3, 3 by the resilient force of the compression spring 32.

In starting the rotation of each of the magnetic disks 3, when the shape memory alloy coil 33 is energized to heat up, the coil 33 elongates against the resilient force of the compression spring 32, causing the outer tubular member 9' to slide toward the sliders 1, 1. In consequence, the inclined part at the end of the outer tubular member 9' engages with the projections 31 to pivot the load arms 5, 5, causing the sliders 1 to be pushed up from the respective magnetic disk surfaces. According to this embodiment, it is possible to construct an exceedingly thin loading/unloading means, conveniently, since the driving force of the loading/unloading means 7 is applied in the direction parallel to the magnetic disk surfaces.

Figure 12:
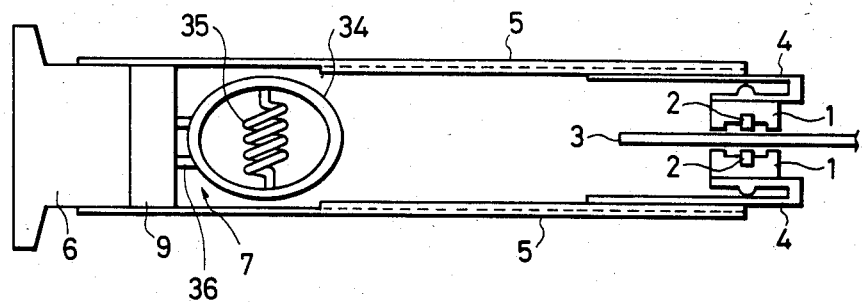
Figure 13:
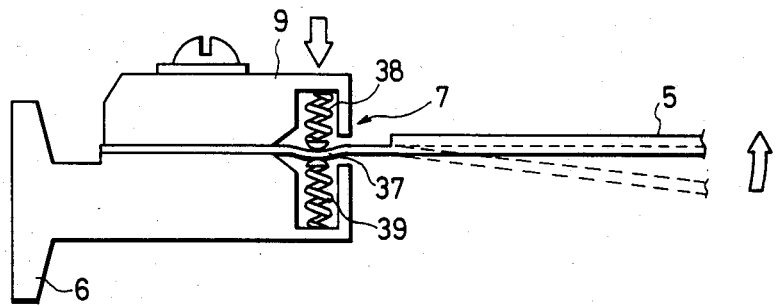
Figure 14:
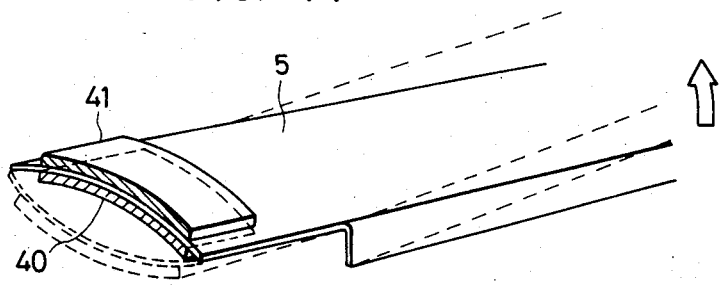

The embodiment shown in FIG. 12 is arranged such that data can be written and read out by means of the magnetic heads 2, 2 with respect to both the surfaces of the magnetic disk 3 similarly to the embodiment shown in FIG. 10. The Figure shows an initial state where both the sliders 1, 1 are pressed on the corresponding surfaces of the magnetic disk 3. The support base 9 for the loading/unloading means 7 has a shape memory alloy ring 34, as a shape memory alloy member, which is disposed between the load arms 5, 5. The shape memory alloy ring 34 is not heated and has an oval shape, as shown in the Figure, at a temperature not higher than its transformation point, the shape being selected so that a slight gap is provided between the ring 34 and each of the load arms 5, 5. A tension spring 35 as a resilient member for applying a bias force has both ends thereof secured to the shape memory alloy ring 34 in the direction of the minor axis thereof. In addition, the support base 9 is provided with a heating element 36 for heating the shape memory alloy ring 34.

When the rotation of the magnetic disc 3 is started, the shape memory alloy ring 34 is heated by energizing the heating element 36. In consequence, the shape memory alloy ring 34 applies a large recovery force against the resilient force of the tension spring 35 and changes in shape from the oval to a circle. In the course of the transformation from the oval to the circle, the shape memory alloy ring 34 engages with the load arms 5, 5 to gradually pivot the same, causing the sliders 1, 1 to be pushed up from the corresponding surfaces of the magnetic disk 3.

According to this embodiment, two sliders can be loaded and unloaded by a single shape memory alloy member, conveniently. In addition, the assembly and mounting of the actuator are greatly facilitated, advantageously, since the shape memory alloy ring, the tension spring and the heating element are integrated with each other.

In the above embodiments, the slider is mounted on the distal end of a loadarm, however, the mounting points is not only the distal end but also anyplace, where access motion of the slider can not be affected.

As has been described, according to the invention, the shape memory alloy member and the resilient member are provided as the driving unit of the loading/unloading means, and moreover, the arrangement in such that in the loading operation the driving unit applies no driving force to the pressing member. Therefore, it is possible to apply a smooth and stable pressing force to the slider. Moreover, a constant pressing force can be applied to the slider in the loading operation.

What is claimed is:

1. A load/unload suspension device for a magnetic disc apparatus comprising, a load arm, a magnetic head support supported by the load arm, a magnetic head section on the magnetic head support, a resilient member acting on the load arm and thereby on said magnetic head support to apply thereto a force acting in the direction of the magnetic disc, and an electrically heated means comprised of a shape memory alloy means for acting against the force applied by said resilient member during unloading, said shape memory alloy means constituted of a thermo-elastic, martensitic Ti-Ni alloy, such that, when the means is electrically heated up to a temperature equal to or above the transformation point, the alloy changes to an austenitic phase, thereby changing the shape of the shape alloy memory means to lift the magnetic head from the magnetic disc and to develop a driving force which is greater than the counteracting force of the resilient member.

2. A load/unload suspension device according to claim 1, wherein there are provided a guide bar for mounting the load arm, a support base upon which are disposed the shape memory alloy means and the resilient member, and a pin for transmitting the driving force to lift said load arm.

3. A load/unload suspension device according to claim 2, wherein the pin is movably arranged in the support base, and, on either end of said pin, a flange-like hook is provided to engage, on one hand, with said resilient member and shape memory alloy means, and, on the other hand, with said load arm, said pin extending through said shape memory alloy means and said load arm with a clearance, whereby, upon application of a load by said load arm to said magnetic head and, respectively, a slider supporting the same, said flange-like hook disposed at the lower end of said pin does not engage with said load arm while being operable to engage with said load arm for unloading said slider.

4. A load/unload suspension device according to claim 1, wherein a guide bar is provided, and a support base is pivotally supported by said guide bar, said shape memory alloy means being U-shaped and mounted between said guide bar and said support base, and said resilient member being disposed between said guide bar and said support base and providing a resilient force against the recovery force of said shape memory alloy means.

* * * * *